United States Patent
Hsu et al.

(10) Patent No.: US 12,293,275 B2
(45) Date of Patent: May 6, 2025

(54) METHODS AND APPARATUSES FOR HIGH PERFORMANCE AND ACCURACY FIXED-POINT SCALE IMPLEMENTATION

(71) Applicant: KWAI INC., Palo Alto, CA (US)

(72) Inventors: Ming Kai Hsu, Freemont, CA (US); Sitong Feng, Hoboken, NJ (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 974 days.

(21) Appl. No.: 17/368,523

(22) Filed: Jul. 6, 2021

(65) Prior Publication Data

US 2023/0010981 A1    Jan. 12, 2023

(51) Int. Cl.
*G06N 3/04* (2023.01)
*G06F 9/30* (2018.01)

(52) U.S. Cl.
CPC ........... *G06N 3/04* (2013.01); *G06F 9/30025* (2013.01)

(58) Field of Classification Search
CPC .................................................. G06F 9/30025
See application file for complete search history.

(56) References Cited

U.S. PATENT DOCUMENTS

| | | | |
|---|---|---|---|
| 2019/0171927 A1* | 6/2019 | Diril | G06N 3/08 |
| 2020/0234130 A1* | 7/2020 | Yan | G06N 3/082 |
| 2022/0067530 A1* | 3/2022 | Khailany | G06F 7/5443 |
| 2022/0222541 A1* | 7/2022 | Matlage | G06N 3/105 |

* cited by examiner

*Primary Examiner* — Michael D. Yaary
(74) *Attorney, Agent, or Firm* — Arch & Lake LLP

(57) ABSTRACT

A method to implement a fixed-point scale layer in a neural network for data processing is provided in the present disclosure. The method includes: receiving fixed-point input data over a channel of a standalone floating-point scale layer, and converting the floating-point input data into fixed-point input data of the standalone floating-point scale layer; obtaining fixed-point quantization parameters in each channel based on the input data and floating-point parameters $\gamma_i$, $\beta_i$ in each channel; converting the standalone floating-point scale layer based on the fixed-point quantization parameters into a fixed-point scale layer for processing the fixed-point input data to generate fixed-point output data; and mapping the fixed-point scale layer to a fixed-point convolution layer and the computation of convolution is done by matrix multiplication that can be executed on a GEMM engine.

21 Claims, 5 Drawing Sheets

METHODS AND APPARATUSES FOR HIGH PERFORMANCE AND ACCURACY FIXED-POINT SCALE IMPLEMENTATION

FIELD

The present application generally relates to data processing in a neural network, and in particular but not limited to, methods and apparatuses for high performance and accuracy fixed-point scale implementation.

BACKGROUND

In the current conventional fixed-point scale layer implementation in a neural network, there are two major issues. The first issue is the performance in both float-point and fixed-point implementation, and the second issue is the accuracy in fixed-point implementation.

SUMMARY

In general, this disclosure describes examples of techniques relating to fixed-point scale implementation in neural network data processing.

According to a first aspect of the present disclosure, a method of quantization is provided. The method includes: receiving floating-point input data over a channel of a standalone floating-point scale layer in a neural network, and converting floating-point input data over a channel of a standalone floating-point scale layer to fixed-point input data; obtaining fixed-point quantization parameters for each channel based on the input data of the scale layer and two floating-point parameters $\gamma_i$, $\beta_i$ in each channel; converting the standalone floating-point scale layer based on the fixed-point quantization parameters into a fixed-point scale layer for processing the fixed-point input data; and mapping the fixed-point scale layer to a fixed-point convolution layer, wherein computation of convolution is done by matrix multiplication executed on a GEMM engine.

According to a second aspect of the present disclosure, an apparatus is provided for data processing, including: one or more processors; and a memory configured to store instructions executable by the one or more processors; wherein the one or more processors, upon execution of the instructions, are configured to: receive floating-point input data over a channel of a standalone floating-point scale layer in a neural network, and converting floating-point input data of a standalone floating-point scale layer to fixed-point input data; obtain fixed-point quantization parameters for each channel based on the input data of the scale layer and floating-point parameters $\gamma_i$, $\beta_i$ in each channel; convert the standalone floating-point scale layer based on the fixed-point quantization parameters into a fixed-point scale layer in the neural network for processing the fixed-point input data; and map the fixed-point scale layer to a fixed-point convolution layer, wherein computation of convolution is done by matrix multiplication executed on a GEMM engine.

According to a third aspect of the present disclosure, a non-transitory computer readable storage medium is provided, including instructions stored therein, where, upon execution of the instructions by one or more processors, the instructions cause the one or more processors to perform acts including: receiving floating-point input data over a channel of a standalone floating-point scale layer in a neural network, and converting floating-point input data over a channel of a standalone floating-point scale layer to fixed-point input data; obtain fixed-point quantization parameters for each channel based on the input data of the scale layer and floating-point parameters $\gamma_i$, $\beta_i$ in each channel; converting the standalone floating-point scale layer based on the fixed-point quantization parameters into a fixed-point scale layer in the neural network for processing the fixed-point input data; and map the fixed-point scale layer to a fixed-point convolution layer, wherein computation of convolution is done by matrix multiplication that executed on a GEMM engine.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
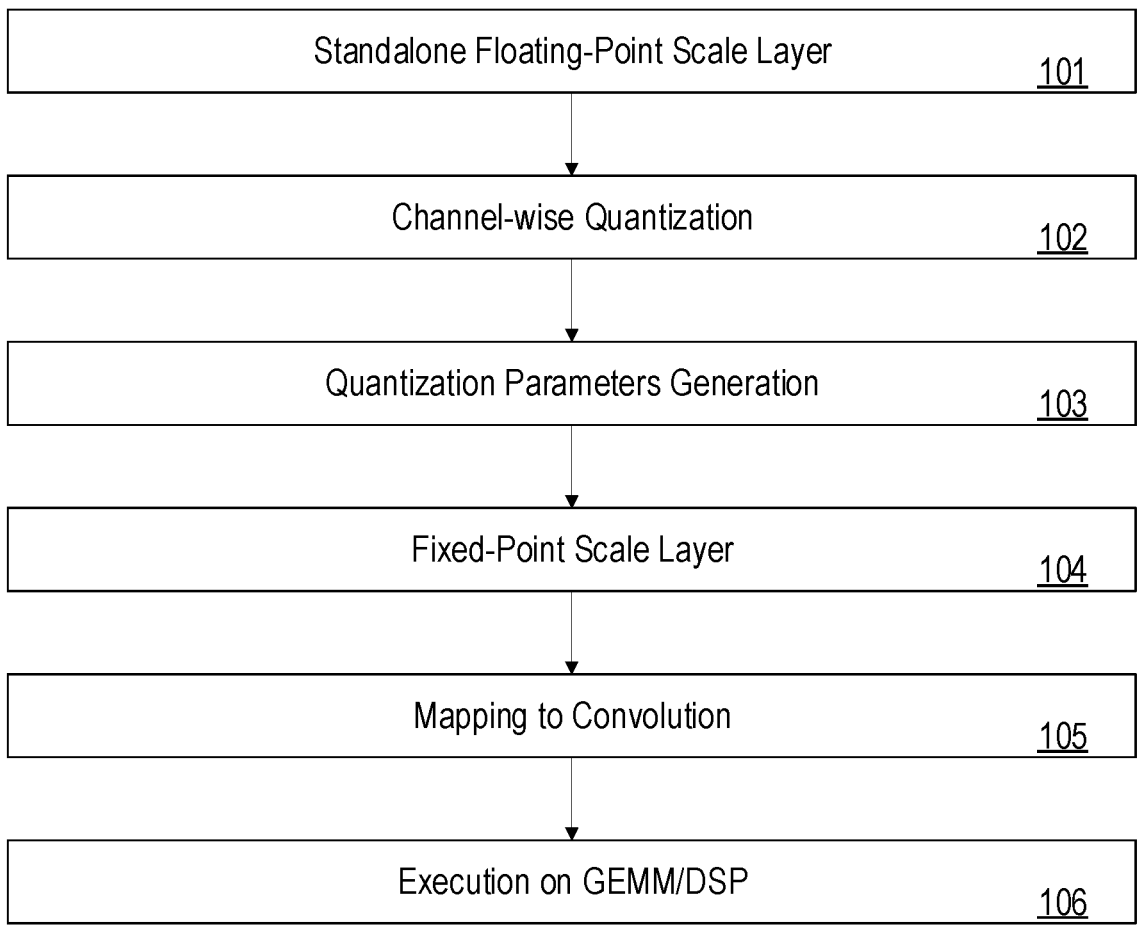
FIG. 1 is a flowchart illustrating an exemplary process of converting a standalone floating-point scale layer into a convolution layer in fixed-point implementation in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Feature learning-based AI algorithms have top accuracy in almost every field over feature-engineering based algorithms. In general, feature learning-based AI algorithms are represented in different forms of neural networks. Comparing with feature-engineering based algorithms, computation costs of neural networks are greater in 2-4 magnitudes. How to reduce the computation cost or improve the computation efficiency on hardware is critical.

To reduce the computation cost, a common approach is quantization since fixed-point computation cost is 1-2 magnitudes less than floating-point computation. The major challenge in quantization is how to keep accuracy in fixed-point. To improve the computation efficiency, matrix multiplication engine is hardwired in the main stream GPU, NPU, FPGA and AI ASIC design. Hardwired execution is more efficient than execution by instruction sets on DSP.

Quantization is one of the popular techniques to reduce the computation cost in inference. The major challenge is how to keep the accuracy in fixed-point. It is relatively easy to keep the fixed-point accuracy in convolution. However, it's harder to keep accuracy in nonlinear and single point data operations such as Softmax, Eltwise Add, Scale, Batchnorm, etc.

The present disclosure relates to a methodology that converts a standalone Scale layer to a convolution layer with high accuracy in fixed-point implementation. Fixed-point Scale layer has better accuracy than conventional fixed-point implementations. Moreover, it is capable to execute on GEMM (General Matrix Multiplication) engine with higher performance than conventional implementation on hardware such as DSP (Digital Signal Processor)/Single Data Point Processor.

Mathematically speaking, fixed-point math, independent of processor speed, is easier to code with and is faster than floating-point math. From circuit design point of view, fixed-point circuit design is simpler and gate counts are less than floating-point circuit design. In consequences, with similar price, computation power in fixed-point is about 4-12× higher than floating-point.

Scale operation is single data point processing. The operation of Scale in each input data point involves with the current input data point and pre-learned $\gamma_i$, $\beta_i$ in each channel. The formula of Scale is as follows:

Input: values of $x_j$ over a channel i with learnt parameters $\gamma_i$, $\beta_i$ respectively.

$$\text{Output: } y_j = \gamma_i x_j + \beta_i$$

Since it is single data processing, it is executed on single data point processing hardware in conventional implementation. For example, Scale is executed on CUDA core, instead of Tensor/GEMM core on GPU or executed on Single Data Point Processor on NVDLA. For another example, Scale is executed on TPC (tensor processing core), instead of GEMM. In general, GEMM has higher computation capabilities than singe data point processor.

For existing fixed-point implementation of standalone Scale layer, it is introduced as follows. The conventional fixed-point method is to generate two fixed-point quantization parameters, $\Gamma$ and B.

Input: $X_i$ (fixed-point) over a channel i $$\text{Output: } Y_i = (\Gamma * X_i + B) >> S$$

The accuracy is lowered in this fixed-point implementation, since $\gamma_i$, $\beta_i$ are unique in each channel in floating-point. However, in fixed-point implementation, $\Gamma$ and B in each channel are the same.

In the present semiconductor industry, the most popular implementation of scale layer on GPU, NPU, FPGA and AI chip is processed in floating-point due to difficulties of achieving accurate fixed-point results.

In some examples of the present disclosure, point-wise processing is converted and implemented by convolution, which can be executed on a variety of hardware, to improve the computation efficiency. The implementations according to examples in the present disclosure relate to convert the scale implementation from single point data processing to matrix multiplication to fully utilize GEMM. It is crucial since in the modern GPU/NPU/AI ASIC design, GEMM is hardwired and the computation efficiency is significantly better than single data point processor. Moreover, another approach is to convert the floating-point standalone scale to fixed-point scale implementation. Both implementations can be stacked up for even better performance improvement. For accuracy improvement in fixed-point implementation, the key point is to keep the quantization parameters unique for each channel.

FIG. 1 is a flowchart illustrating an exemplary process of converting a standalone scale layer into a convolution layer with high accuracy in fixed-point implementation in accordance with some implementations of the present disclosure. More specifically, FIG. 1 illustrates quantization per channel algorithm for standalone scale layer.

In Step 101, in a standalone floating-point scale layer of a neural network, its floating-point input data is converted to fixed-point data.

In Steps 102 and 103, channel-wise quantization is performed. The fixed-point quantization parameters for each channel are generated based on the input data of the scale layer and floating-point parameters $\gamma_i$, $\beta_i$ in each channel.

In Step 104, the standalone floating-point scale layer is converted into a fixed-point scale layer, based on the fixed-point quantization parameters in each channel, to process the fixed-point input data.

In Step 105, the fixed-point scale layer is mapping to a fixed-point convolution layer for matrix multiplication.

In Step 106, the matrix multiplication of the fixed-point convolution layer can be executed on a General Matrix Multiplication (GEMM) engine or a Multiply-accumulate (MAC) operations array.

In a standalone floating-point scale layer of a neural network, one or more channels exist. For each one channel in the scale layer, the fixed-point quantization parameters are generated separately.

Figure 2:
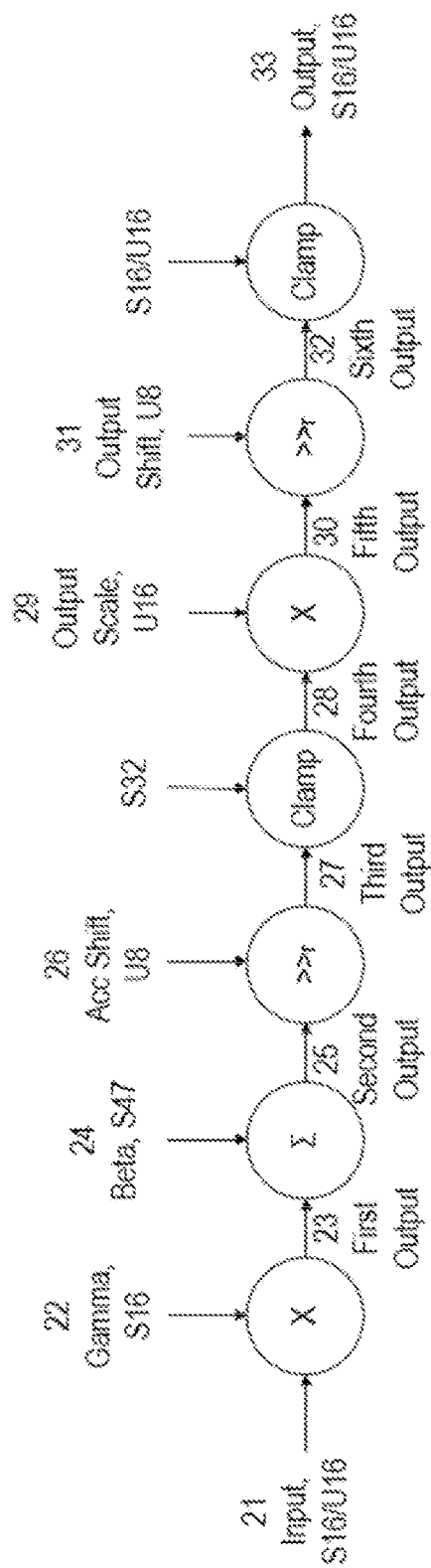
FIG. 2 is a flow diagram illustrating an exemplary fixed-point scale computation process in each channel in accordance with some implementations of the present disclosure.
Figure 3:
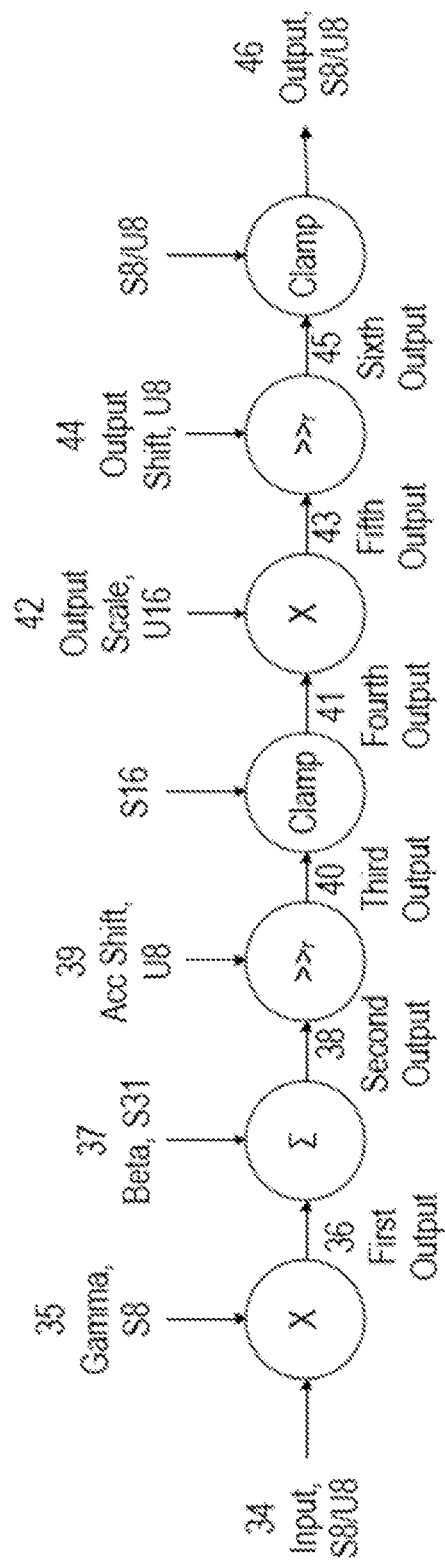
FIG. 3 is a flow diagram illustrating an exemplary fixed-point scale computation process in each channel in accordance with some implementations of the present disclosure.

FIG. 2 and FIG. 3 are flow diagrams illustrating exemplary of fixed-point scale computation process in each channel in accordance with some examples of the present disclosure.

FIG. 2 illustrates an exemplary of 16-bit fixed-point scale computation process in each channel. The input is 16-bit (S16 or U16) fixed-point data. Firstly, for a channel of a standalone fixed-point scale layer, the fixed-point input data 21 received in the channel is multiplied with the first fixed-point quantization parameter 22 in size S16 to receive a first output 23. Then, the first output 23 and the second fixed-point quantization parameter 24 in size S47 are summed up to receive a second output 25. Thirdly, the second output 25 is right shifted with an accumulator shift 26 in size U8 to receive a third output 27.

Then, the third output 27 is clamped to receive a fourth output 28 in size S32, and the fourth output 28 is multiplied with an output scale 29 in size U16 to receive a fifth output 30. The fifth output 30 is right shifted with an output shift 31 in size U8 to receive a sixth output 32, and the sixth output 32 is clamped into the output data 33 in size S16 or U16 for the channel.

In some examples of the present disclosure, the right shift is performed with rounding, and asymmetric rounding is preferred. Rounding term=pow (2, shift-1). For the fixed-point input data in the size of 16-bit, the preferred range of the second fixed-point quantization parameter 23 is 30 to 47 bits.

FIG. 3 illustrates an exemplary of 8-bit fixed-point scale computation process in each channel. The input is 8-bit (S8 or U8) fixed-point data. Firstly, for a channel of a standalone fixed-point scale layer, the fixed-point input data 34 received in the channel is multiplied with the first fixed-point quantization parameter 35 in size S8 to receive a first output 36. Then, the first output 36 and the second fixed-point quantization parameter 37 in size S31 are summed up to receive a second output 38. Thirdly, the second output 38 is right shifted with an accumulator shift 39 in size U8 to receive a third output 40. Then, the third output 40 is clamped to receive a fourth output 41 in size S16, and the fourth output 41 is multiplied with an output scale 42 in size U16 to receive a fifth output 43. The fifth output 43 is right shifted with an output shift 44 in size U8 to receive a sixth output 45, and the sixth output 45 is clamped into the output data 46 in size S8 or U8 for the channel.

In some examples of the present disclosure, the right shift is performed with rounding, and asymmetric rounding is preferred. Rounding term=pow (2, shift-1). For the fixed-point input data in the size of 8-bit, the preferred range of the second fixed-point quantization parameter 33 is 15 to 31 bits.

Figure 4:
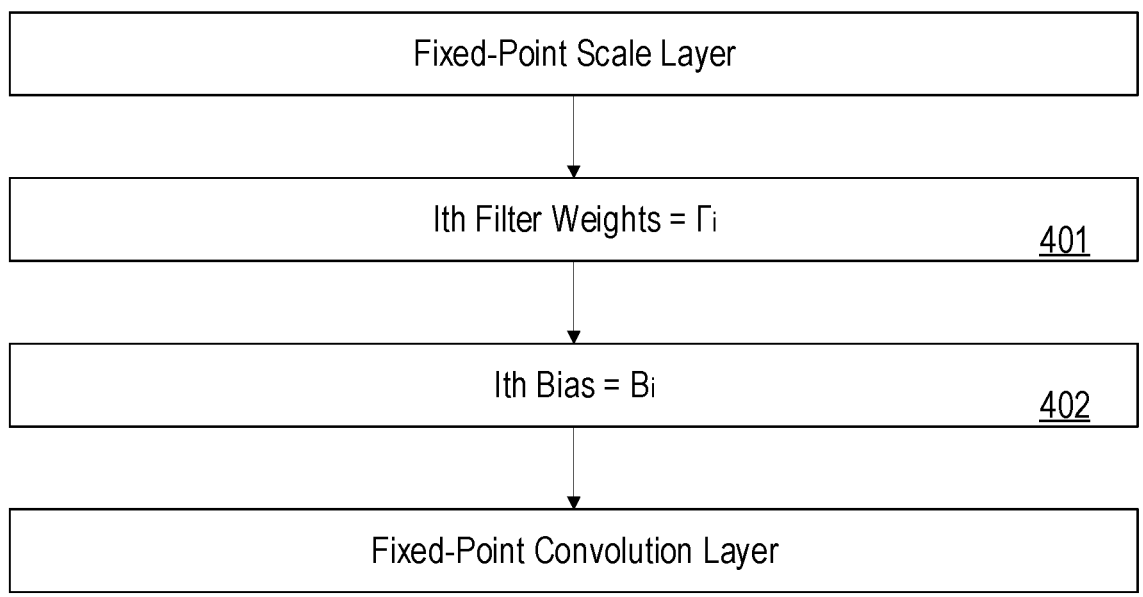
FIG. 4 is a block diagram illustrating an exemplary process of converting a scale layer into a convolution layer in accordance with some implementations of the present disclosure.

FIG. 4 is a block diagram illustrating how to convert a standalone scale layer to a convolution layer step-by-step. With the conversion, single point data processing is executed on GEMM with improved computation efficiency.

In Step 401, for channel i of the standalone fixed-point scale layer, the quantization parameter $\Gamma_i$ is equivalent to weights in filter i in convolution. Then, in Step 402, the beta $B_i$ for each channel is equivalent to bias in each filter. With this configuration, the fixed-point scale layer is mapped into a fixed-point convolution layer.

Figure 5:
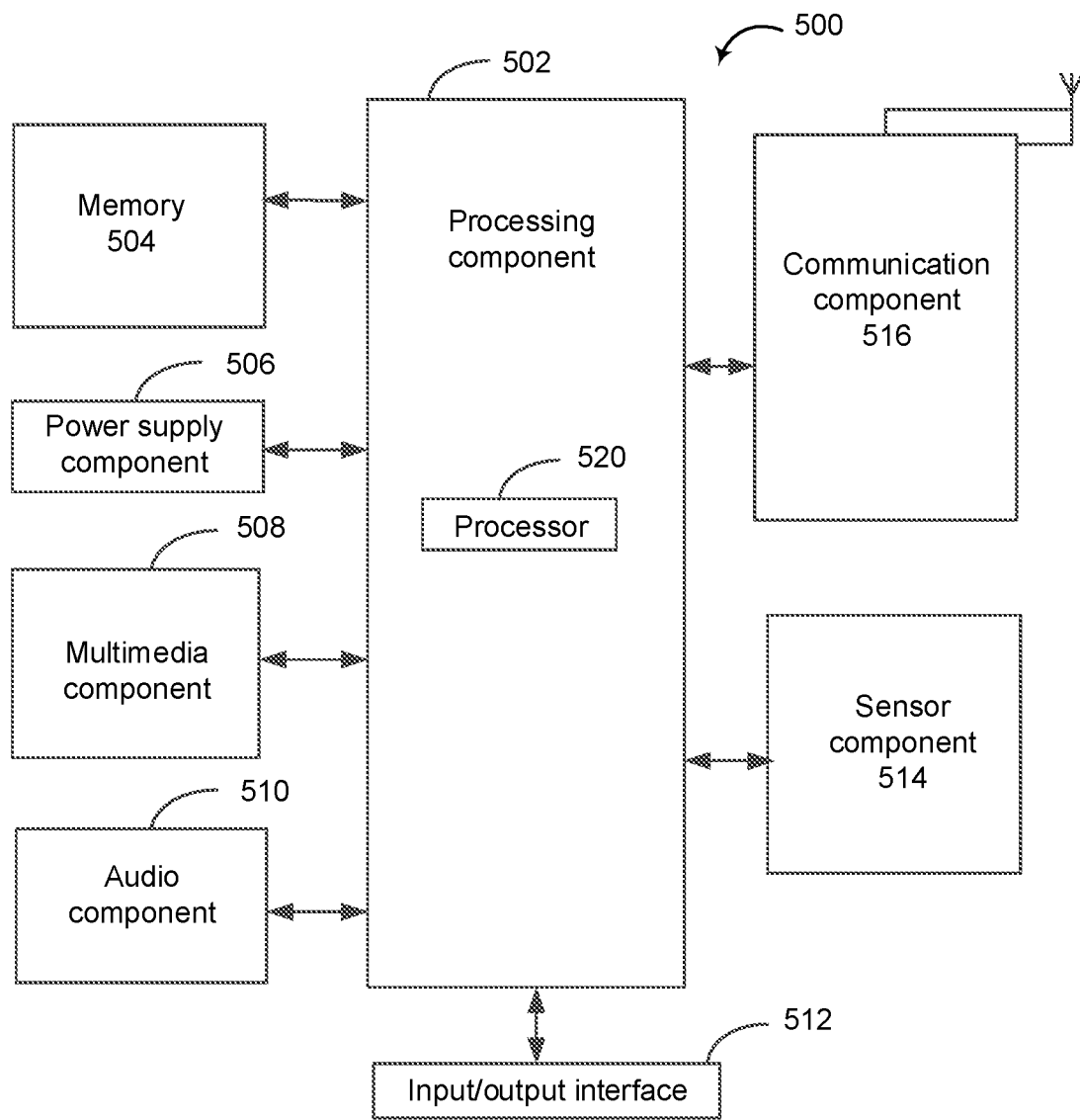
FIG. 5 is a block diagram illustrating an exemplary apparatus for data processing in accordance with some implementations of the present disclosure.

FIG. 5 is a block diagram illustrating an exemplary apparatus for data processing in accordance with some implementations of the present disclosure. The apparatus 500 may be a terminal, such as a mobile phone, a tablet computer, a digital broadcast terminal, a tablet device, or a personal digital assistant.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502. The one or more processors 520 may include a GEMM processor, a point-wise processor, a digital signal processor (DSP), etc.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc. The storage medium may be used to store or buffer data, network, and parameters.

Figure 6:
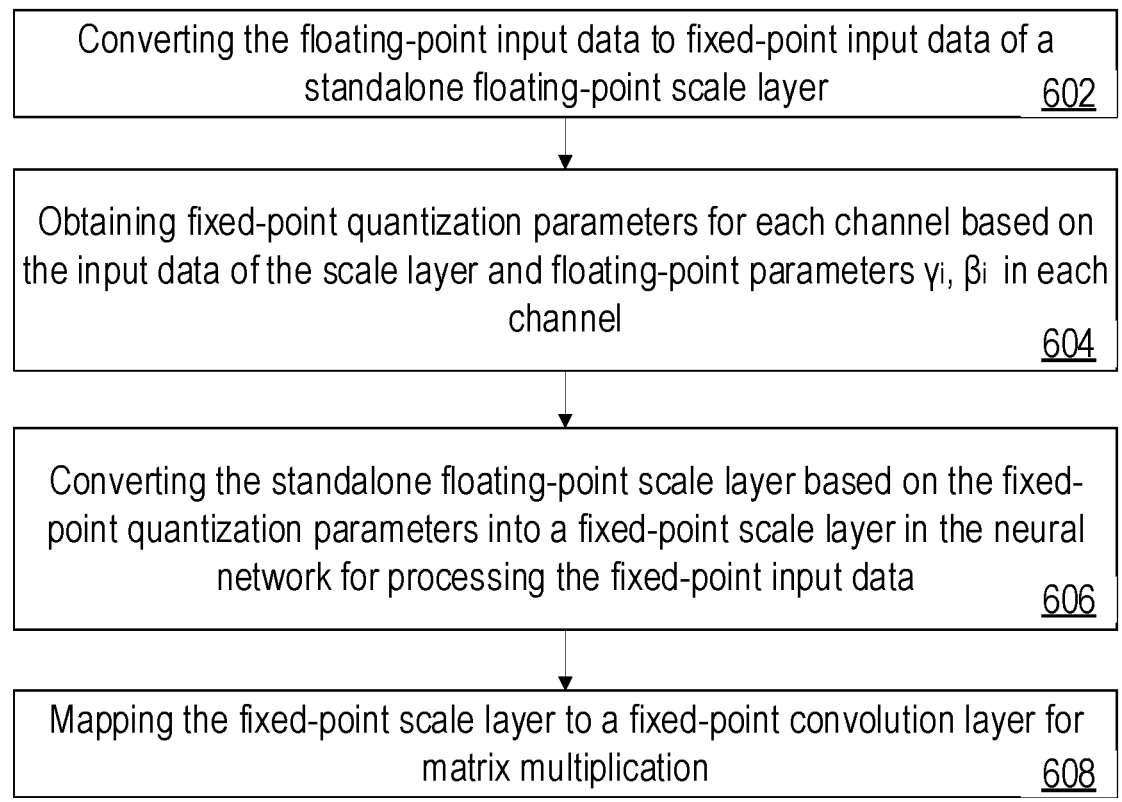
FIG. 6 is a flowchart illustrating an exemplary process of implementing a fixed-point scale layer in a neural network in accordance with some implementations of the present disclosure.

FIG. 6 is a flowchart illustrating an exemplary process of implementing a fixed-point scale layer in a neural network in accordance with some implementations of the present disclosure.

In step 602, the processor 520 converts the floating-point input data to fixed-point input data of a standalone floating-point scale layer.

In step 604, the processor 520 obtains fixed-point quantization parameters for each channel based on the input data of the scale layer and floating-point parameters $\gamma_i$, $\beta_i$ in each channel.

In step 606, the processor 520 converts the standalone floating-point scale layer based on the fixed-point quantization parameters into a fixed-point scale layer for processing the fixed-point input data to receive an output data.

In step 608, the processor 520 maps the fixed-point scale layer to a fixed-point convolution layer for matrix multiplication.

In some examples, there is provided an apparatus for data processing. The apparatus includes one or more processors 520; and a memory 504 configured to store instructions executable by the one or more processors; where the one or more processors, upon execution of the instructions, are configured to perform a method as illustrated in FIG. 6.

In some other examples, there is provided a non-transitory computer readable storage medium 504, having instructions stored therein. When the instructions are executed by one or more processors 520, the instructions cause the processors to perform a method as illustrated in FIG. 6.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A data processing method, comprising:
   receiving floating-point input data over a channel of a standalone floating-point scale layer in a neural network, and converting the floating-point input data into fixed-point input data of the standalone floating-point scale layer;
   obtaining fixed-point quantization parameters in each channel based on input data and two floating-point parameters $\gamma_i$, $\beta_i$ in each channel, wherein the standalone floating-point scale layer comprises a plurality of channels, and the fixed-point quantization parameters are generated separately for each of the plurality of channels;
   converting the standalone floating-point scale layer based on the fixed-point quantization parameters into a fixed-point scale layer for processing the fixed-point input data to generate fixed-point output data; and mapping the fixed-point scale layer to a fixed-point convolution layer, wherein computation of convolution is done by matrix multiplication executed on a General Matrix Multiplication (GEMM) engine.

2. The data processing method according to claim 1, wherein processing the fixed-point input data to generate the fixed-point output data further comprises:
for the fixed-point input data in a size of 16-bit, multiplying the fixed-point input data with a first fixed-point quantization parameter in size S16 to receive a first output;
summing up the first output and a second fixed-point quantization parameter in size S47 to receive a second output;
right shifting with rounding the second output with an accumulator shift in size U8 to receive a third output;
clamping the third output to receive a fourth output in size S32;
multiplying the fourth output with an output scale in size U16 to receive a fifth output;
right shifting with rounding the fifth output with an output shift in size U8 to receive a sixth output; and
clamping the sixth output into the fixed-point output data in size S16 or U16.

3. The data processing method according to claim 2, wherein for the fixed-point input data in the size of 16-bit, a preferred range of the second fixed-point quantization parameter is 30 to 47 bits.

4. The data processing method according to claim 1, wherein processing the fixed-point input data to generate the fixed-point output data further comprises:
for the fixed-point input data in a size of 8-bit, multiplying the fixed-point input data with a first fixed-point quantization parameter in size S8 or U8 to receive a first output;
summing up the first output and a second fixed-point quantization parameter in size S31 to receive a second output;
right shifting with rounding the second output with an accumulator shift in size U8 to receive a third output;
clamping the third output to receive a fourth output in size S16;
multiplying the fourth output with an output scale in size U16 to receive a fifth output;
right shifting with rounding the fifth output with an output shift in size U8 to receive a sixth output; and
clamping the sixth output into the fixed-point output data in size S8 or U8.

5. The data processing method according to claim 4, wherein for the fixed-point input data in the size of 8-bit, a preferred range of the second fixed-point quantization parameter is 15 to 31 bits.

6. The data processing method according to claim 1, wherein mapping the fixed-point scale layer to the fixed-point convolution layer further comprises:
multiplying the fixed-point input data with a filter weight for the channel in the fixed-point scale layer to receive a product; and
summing up the product and a bias for the channel in the fixed-point scale layer.

7. The data processing method according to claim 1, wherein the matrix multiplication is executed on a GEMM engine or a Multiply-Accumulate (MAC) operations array.

8. An apparatus for implementing a neural network, comprising:
one or more processors; and
a memory configured to store instructions executable by the one or more processors;
wherein the one or more processors, upon execution of the instructions, are configured to:
receive floating-point input data over a channel of a standalone floating-point scale layer in a neural network, and convert the floating-point input data into fixed-point input data of the standalone floating-point scale layer;
obtain fixed-point quantization parameters in each channel based on input data and two floating-point parameters $\gamma_i$, $\beta_i$ in each channel, wherein the standalone floating-point scale layer comprises a plurality of channels, and the fixed-point quantization parameters are generated separately for each of the plurality of channels;
convert the standalone floating-point scale layer based on the fixed-point quantization parameters into a fixed-point scale layer in the neural network for processing the fixed-point input data to generate fixed-point output data; and
map the fixed-point scale layer to a fixed-point convolution layer, wherein computation of convolution is done by matrix multiplication executed on a GEMM engine.

9. The apparatus of claim 8, wherein the one or more processors are further configured to:
for the fixed-point input data in a size of 16-bit, multiply the fixed-point input data with a first fixed-point quantization parameter in size S16 to receive a first output;
sum up the first output and a second fixed-point quantization parameter in size S47 to receive a second output;
right shift with rounding the second output with an accumulator shift in size U8 to receive a third output;
clamp the third output to receive a fourth output in size S32;
multiply the fourth output with an output scale in size U16 to receive a fifth output;
right shift with rounding the fifth output with an output shift in size U8 to receive a sixth output; and
clamp the sixth output into the output data in size S16 or U16.

10. The apparatus of claim 9, wherein for the fixed-point input data in the size of 16-bit, a preferred range of the second fixed-point quantization parameter is 30 to 47 bits.

11. The apparatus of claim 8, wherein the one or more processors are further configured to:
for the fixed-point input data in a size of 8-bit, multiply the fixed-point input data with a first fixed-point quantization parameter in size S8 or U8 to receive a first output;
sum up the first output and a second fixed-point quantization parameter in size S31 to receive a second output;
right shift with rounding the second output with an accumulator shift in size U8 to receive a third output;
clamp the third output to receive a fourth output in size S16;
multiply the fourth output with an output scale in size U16 to receive a fifth output;
right shift with rounding the fifth output with a third parameter in size U8 to receive a sixth output; and
clamp the sixth output into the fixed-point output data in size S8 or U8.

12. The apparatus of claim 11, wherein for the fixed-point input data in the size of 8-bit, a preferred range of the second fixed-point quantization parameter is 15 to 31 bits.

13. The apparatus of claim 8, the one or more processors are further configured to:

multiply the fixed-point input data with a filter weight for the channel in the fixed-point scale layer to receive a product; and sum up the product and a bias for the channel in the fixed-point scale layer.

14. The apparatus of claim 8, wherein the matrix multiplication is executed on a GEMM engine or a MAC operations array.

15. A non-transitory computer readable storage medium, comprising instructions stored therein to implement a neural network, wherein, upon execution of the instructions by one or more processors, the instructions cause the one or more processors to perform acts comprising:

receiving floating-point input data over a channel of a standalone floating-point scale layer in a neural network, and converting the floating-point input data into fixed-point input data of the standalone floating-point scale layer;

obtaining fixed-point quantization parameters in each channel based on input data and two floating-point parameters $\gamma_i$, $\beta_i$ in each channel, wherein the standalone floating-point scale layer comprises a plurality of channels, and the fixed-point quantization parameters are generated separately for each of the plurality of channels;

converting the standalone floating-point scale layer based on the fixed-point quantization parameters into a fixed-point scale layer in the neural network for processing the fixed-point input data to generate fixed-point output data; and mapping the fixed-point scale layer to a fixed-point convolution layer, wherein computation of convolution is done by matrix multiplication that executed on a GEMM engine.

16. The non-transitory computer readable storage medium of claim 15, wherein processing the fixed-point input data to generate the fixed-point output data further comprises:

for the fixed-point input data in a size of 16-bit, multiplying the fixed-point input data with a first fixed-point quantization parameter in size S16 to receive a first output;

summing up the first output and a second fixed-point quantization parameter in size S47 to receive a second output;

right shifting with rounding the second output with an accumulator shift in size U8 to receive a third output;

clamping the third output to receive a fourth output in size S32;

multiplying the fourth output with an output scale in size U16 to receive a fifth output;

right shifting with rounding the fifth output with an output shift in size U8 to receive a sixth output; and clamping the sixth output into the fixed-point output data in size S16 or U16.

17. The non-transitory computer readable storage medium of claim 16, wherein for the fixed-point input data in the size of 16-bit, a preferred range of the second fixed-point quantization parameter is 30 to 47 bits.

18. The non-transitory computer readable storage medium of claim 15, wherein processing the fixed-point input data to generate the fixed-point output data further comprises:

for the fixed-point input data in a size of 8-bit, multiplying the fixed-point input data with a first fixed-point quantization parameter in size S8 or U8 to receive a first output;

summing up the first output and a second fixed-point quantization parameter in size S31 to receive a second output;

right shifting with rounding the second output with an accumulator shift in size U8 to receive a third output;

clamping the third output to receive a fourth output in size S16;

multiplying the fourth output with an output scale in size U16 to receive a fifth output;

right shifting with rounding the fifth output with a third parameter in size U8 to receive a sixth output; and clamping the sixth output into the fixed-point output data in size S8 or U8.

19. The non-transitory computer readable storage medium of claim 18, wherein for the fixed-point input data in the size of 8-bit, a preferred range of the second fixed-point quantization parameter is 15 to 31 bits.

20. The non-transitory computer readable storage medium of claim 15, wherein mapping the fixed-point scale layer to the fixed-point convolution layer further comprises:

multiplying the fixed-point input data with a filter weight for the channel in the fixed-point scale layer to receive a product; and summing up the product and a bias for the channel in the fixed-point scale layer.

21. The non-transitory computer readable storage medium of claim 15, wherein the matrix multiplication is executed on GEMM engine or a MAC operations array.

* * * * *

UNITED STATES PATENT AND TRADEMARK OFFICE
CERTIFICATE OF CORRECTION

| | | |
|---|---|---|
| PATENT NO. | : 12,293,275 B2 | Page 1 of 1 |
| APPLICATION NO. | : 17/368523 | |
| DATED | : May 6, 2025 | |
| INVENTOR(S) | : Hsu et al. | |

It is certified that error appears in the above-identified patent and that said Letters Patent is hereby corrected as shown below:

On the Title Page

Item [73], delete "BEIJING DAJIA INTERNET INFORMATION TECHNOLOGY CO., LTD" insert -- BEIJING TRANSTREAMS TECHNOLOGY CO. LTD. --

Signed and Sealed this
Tenth Day of June, 2025

Coke Morgan Stewart
*Acting Director of the United States Patent and Trademark Office*